REVERSE EPITAXIAL TRANSISTOR

Filed Oct. 8, 1962 4 Sheets-Sheet 1

*INVENTOR.*
JAMES P. FERGUSON
BY
*Lippincott, Ralls & Hendricson*
ATTORNEYS

April 5, 1966 J. P. FERGUSON 3,244,950

REVERSE EPITAXIAL TRANSISTOR

Filed Oct. 8, 1962 4 Sheets-Sheet 2

INVENTOR.
JAMES P. FERGUSON

BY

Lippincott, Ralls & Hendricson

ATTORNEYS

April 5, 1966 J. P. FERGUSON 3,244,950

REVERSE EPITAXIAL TRANSISTOR

Filed Oct. 8, 1962 4 Sheets-Sheet 3

INVENTOR.
JAMES P. FERGUSON
BY
Lippincott, Ralls & Hendricson
ATTORNEYS

INVENTOR.
JAMES P. FERGUSON
BY
Lippincott, Ralls & Hendricson
ATTORNEYS 3,244,950
Patented Apr. 5, 1966

3,244,950

REVERSE EPITAXIAL TRANSISTOR

James P. Ferguson, Los Altos, Calif., assignor to Fairchild Camera and Instrument Corporation, Syosset, N.Y., a corporation of Delaware Filed Oct. 8, 1962, Ser. No. 228,807
3 Claims. (Cl. 317—235)

This invention relates to a type of transistor, herein called a reverse epitaxial transistor, which is particularly useful in common-emitter integrated circuits. The reverse epitaxial transistor is different from the conventional epitaxial transistor in that its emitter is buried beneath the epitaxial layer and its collector is at the surface of the layer. The invention also provides methods of making reverse epitaxial transistors.

In integrated semiconductor circuits, a plurality of transistors and other circuit elements may be formed by diffusing impurities into selected areas of a single semiconductor wafer, or into an epitaxial layer adjacent to one surface of the wafer. Conventionally, the collector regions are diffused in first, and extend most deeply into the wafer; the base regions are diffused in next, and lie within and above the collector regions; and the emitter regions are diffused in last, and lie between the base regions and the surface. This conventional order of the regions, collector below base below emitter, is awkward from a circuit-design viewpoint. Most circuits require electrical isolation of the several collector regions, one from another. This can be achieved in various ways, for example, by providing an additional, reverse-biased PN junction between each collector region and the underlying bulk of the wafer. However, this method of isolation increases the complexity of the device, and also has other disadvantages.

Common-emitter transistor circuits are very desirable for many purposes and are therefore in wide use. An amplifier having higher power gain is obtained by a connected or grounded-emitter circuit configuration than by either grounded-base or grounded-collector circuits. Also, common-emitter configurations are widely used in logic circuits for computer for switching purposes. In the conventional collector below base below emitter configuration, the emitter regions of many semiconductor wafers must be connected together without shorting the base and collector regions which also extend to the same surface. This has been done in the past by depositing metal leads over a layer of oxide deposited or grown on the surface of the semiconductor. The fabrication of common-emitter integrated circuits in this manner requires extremely precise manufacturing techniques. The slightest errors of registration or the like cause faulty production and a high rate of rejection.

The present invention provides a transistor configuration in which the usual order of the regions is reversed—the emitter region lies most deeply within the wafer, the base region lies above the emitter region, and the collector region lies between the base region and the surface. With this configuration, the emitters may all be connected together and grounded through the bulk material of the wafer, particularly through the substrate beneath an epitaxial layer in which the transistors are formed. This kind of internal connection eliminates the need for any external connection between the emitters. Other advantages are also achieved. For example, the collector junctions can be made shallower with less inherent capacitance shunting them. This improves high frequency performance. Also, a shallower collector region minimizes the collector charge storage when the transistor is operated in the saturation condition for faster switching. Additionally, collector regions, being next to the surface, are easily contacted for circuit connections.

By prior conventional diffusion techniques, it is not feasible to manufacture transistors in which the emitter is buried below the base within the wafer. In a conventional diffused epitaxial transistor, a substrate is prepared from a low resistivity wafer of semiconductor material. A high resistivity epitaxial layer which serves as the collector is then deposited on this wafer. Then impurities are diffused into this epitaxial layer from its top surface to form, successively, the base and emitter regions. Each diffusion process reduces the resistivity of the semiconductor in the area receiving the impurities; therefore, the first region diffused into the epitaxial layer extends most deeply into the wafer and has the highest resistivity; and the last region diffused in lies at the surface and contains the highest impurity concentration (the lowest resistivity). Since the emitter should have a higher impurity concentration than the other regions, it necessarily follows that the emitter is normally the region lying between the base region and the surface.

The reverse epitaxial transistors of this invention are made in such a way that it is possible to have a low-resistivity or high impurity concentration emitter buried in the epitaxial layer. They comprise a substrate of emitter conductivity type with a high-resistivity epitaxial layer of the same conductivity type deposited upon it. The substrate is preferably of low resistivity if contact is to be made with the buried emitter through it. Either N or P conductivity type is used, depending upon whether an NPN or PNP transistor is desired. The transistor is then formed in this epitaxial layer. The transistor itself has a first region of low resistivity, the emitter, of emitter conductivity type, formed in the area where the epitaxial layer meets the substrate. If desired, this emitter may be the substrate itself. Adjacent to this first region is a second region, the base, of higher resistivity than the first region, and of the opposite, or base conductivity type. This base region forms a PN junction with the emitter. It is critical that the charge carrier concentration in the area of the emitter immediately beneath the emitter-base junction be substantially in excess of the average charge carrier concentration in the portion of the base beneath the collector. A third region, the collector, is of emitter conductivity type and either the same or different resistivity from the emitter region. It is formed within the base region, providing a base-collector junction. The base region isolates the collector region from the emitter region and from the remainder of the epitaxial layer.

Briefly, this transistor can be manufactured in one of several ways. Two of these start with preparation of a substrate with a high-resistivity epitaxial layer upon it. In the first method, a first low-resistivity region is diffused into the epitaxial layer. The resistivity of the surface portion of this first region is increased by outdiffusion. The outdiffusion also increases the resistivity of the epitaxial layer. A low-resistivity region remains beneath a high-resistivity surface portion. This low-resistivity region is the emitter of the transistor. To accomplish the outdiffusion, the substrate is heated, either in an oxidizing atmosphere or in a vacuum. Where an oxidizing atmosphere is used, surface oxide forms. During oxidation, the impurities near the surface are drawn out into the atmosphere or the oxide, as the case may be. It has been found that certain impurities are more soluble in the oxide than they are in the semiconductor material of the epitaxial layer. Therefore, a higher resistivity region is formed in the region at the surface of the block above and adjacent to the low-resistivity emitter as the impurities diffuse out. A second region of impurities of the opposite type from the emitter is diffused into this high-resistivity region. This region forms the base. The concentration of impurities in the base is carefully maintained so that it ends up less than that in the emitter. Finally, a small collector region of the same conductivity type as the emitter is diffused into the base. The collector is generally of higher resistivity than the emitter, but may be of equal or lower resistivity if desired. The impurities used are conventional shallow-level impurities, such as phosphorus, arsenic, or antimony (N-type) and boron, aluminum, gallium or indium (P-type).

The second method also starts with a substrate having a thin, high-resistivity epitaxial layer deposited upon it. A small pattern of impurities of the same conductivity type as the epitaxial layer is formed on its surface. Then a second epitaxial layer of the same conductivity type and high resistivity is deposited on the first layer, over this pattern of impurities. The impurities are diffused through the first epitaxial layer either during or after the formation of the second layer so that a low-resistivity emitter region diffuses through the first epitaxial layer and makes contact with the substrate. The base region, of higher resistivity and of opposite conductivity type from the emitter region is then diffused into the second epitaxial layer and into contact with the emitter region. An emitter-base junction is thereby formed. Finally, a collector region is diffused into the base region by methods known in the art, thus completing the epitaxial transistor.

A third method starts with a substrate of semiconductor material. A small pattern of impurities of the same conductivity type as the substrate is formed on its surface to form the low-resistivity emitter. Then an epitaxial layer of the same conductivity type, but of higher resistivity, is deposited on the substrate over the pattern of impurities. Another region—the base—of the opposite conductivity type from the substrate is diffused from the surface into the high-resistivity epitaxial layer, and into contact with the low-resistivity impurity pattern, forming a base-emiter junction. Finally, the collector of the transistor, of the same conductivity type as the substrate, is diffused into the base from the surface of the epitaxial layer, forming a collector-base junction. This completes the reverse epitaxial transistor.

A fourth method begins by predepositing two regions of emitter conductivity type, one surrounding the other, on a substrate of the same conductivity type. An epitaxial layer of the opposite, or base, conductivity type is then grown over the two regions. The outside region is diffused through the epitaxial layer, isolating a portion of the epitaxial layer to serve as the base. The inside region serves as the emitter. A collector region is finally diffused into this isolated base region to complete the transistor.

The invention may be better undersood from the following more detailed description and the drawings, in which:

FIG. 1A–D are a series of greatly enlarged, somewhat schematic transverse sections illustrating one method of making the devices of this invention;

FIG. 2A–D are a series of greatly enlarged, somewhat schematic transverse sections illustrating another method of making the devices of this invention;

Figure 8A:
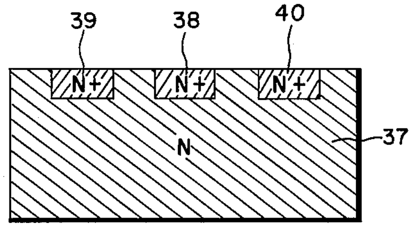
Figure 8B:
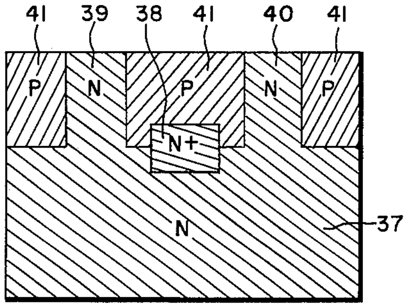
Figure 8C:
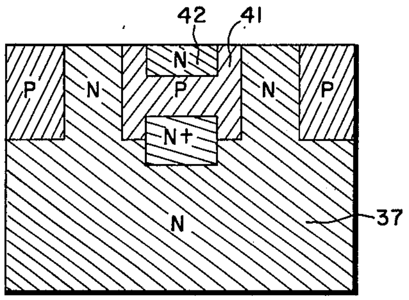
Figure 9:
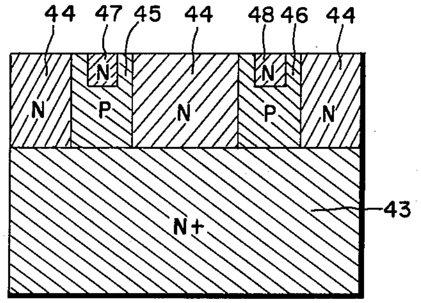

FIG. 7A–D are a series of greatly enlarged, somewhat schematic transverse sections illustrating another method of making the devices of this invention;

FIG. 8A–C are a series of somewhat schematic, greatly enlarged, transverse sections of a device of another embodiment of the invention; and FIG. 9 is a somewhat schematic, greatly enlarged, transverse section of a device of still another embodiment of the invention.

Figure 1A:
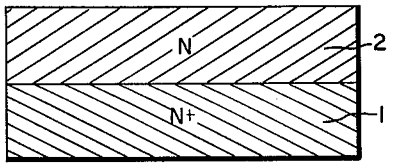
Figure 2A:
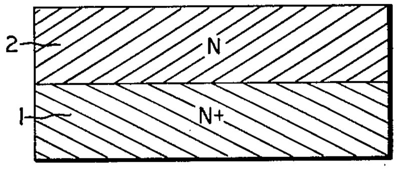

Referring now to FIGS. 1 and 2, the substrate 1 and epitaxial layer 2 shown in FIG. 1A is prepared. The substrate is a block of semiconductor material. If the substrate itself is to be the emitter (in an embodiment to be described later) or if contact to an emitter is made through the substrate, then it is of low resistivity. If neither of the above is the case, then it may be a high resistivity substrate. It can be of either conductivity type, but in the drawing it is shown as N+, designating a low-resistivity N conductivity type material. Should the substrate be of P conductivity type, the conductivity types of all the other regions in the device are reversed.

An epitaxial layer of the same conductivity type and of higher resistivity (designated by N) is deposited on the substrate 1. Two vapor growth processes have been developed for the formation of epitaxial layers on silicon and germanium semiconductor devices. The first is by vacuum evaporation of single-crystal thin films of semiconductor, e.g., silicon, on a silicon substrate crystal. The other method of epitaxial growth utilizes the reduction or disproportionation of gaseous halides on the substrate at elevated temperatures. Both of these methods are described in "Handbook of Semiconductor Electronics," L. P. Hunter, editor, McGraw-Hill Publishing Co., York, Pa., 2d edition, 1962, sub-chapter 7.11.

Figure 1B:
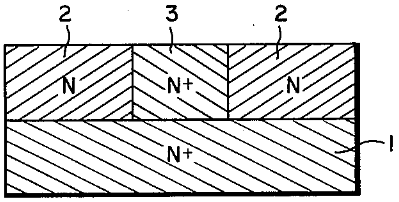
Figure 2B:
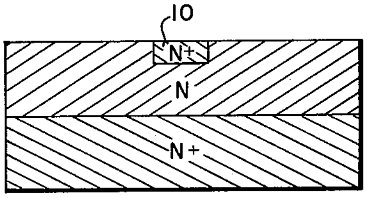

In the embodiment shown in FIG. 1B, N+ region 3 is diffused through the epitaxial layer 2 from the surface. To accomplish this, the surface is usually masked, as by silicon dioxide, using methods well known in the art. An opening is etched in the oxide and conventional N-type shallow-level impurities (described above) are diffused through the opening to form region 3. This region is to be of low resistivity; therefore a high concentration of these impurities is diffused into it.

Next, in order to prepare a high-resistivity region above the emitter into which to diffuse the higher-resistivity base and collector regions of the transistor, an outdiffusion step is employed. The block of semiconductor is heated so that outdiffusion can take place either in an oxidizing atmosphere wherein a layer of oxide 4 shown in FIG. 1C forms simultaneously around the semiconductor, or in a vacuum. Air, oxygen, water vapor, or other well-known oxidizing agents may be used. If the semiconductor is silicon, it is preferable to outdiffuse in an oxidizing atmosphere and simultaneously form a protective coating of oxide on the semiconductor. This oxide layer protects the surface during and after manufacture, resulting in improved transistor quality and reliability. Gallium and aluminum, for example, diffuse out into or through an oxide layer very easily. When they are used, an oxidizing atmosphere is therefore preferred. With gallium, outdiffusion is induced by the presence of hydrogen in addition to the oxidizing agent. When impurities are used which do not readily diffuse through the oxide, then vacuum outdiffusion is used.

The time required for outdiffusion depends first upon the thickness of the outdiffused region desired, and second upon the outdiffusion temperature used. This temperature is not critical, although it has been found that diffusion of the usual donor and acceptor impurities is extremely slow at temperatures below about 1100° C. for silicon or about 500° C. for germanium. At temperatures above about 1300°–1400° C., the oxide coating on silicon begins to break down, with deleterious effects. Of course, oxide breakdown is not a factor in vacuum diffusion, so higher temperatures may be used. The total time required may be anywhere from a few minutes to many hours. The actual times and temperatures required for a particular semiconductor may be easily selected by one skilled in the art, according to the foregoing general principles.

Figure 1C:
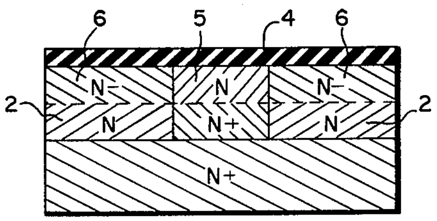

After outdiffusion the device is shown in FIG. 1C. In the region which was previously N+ (low resistivity), an area 5 is formed at the surface of the device of high resistivity (designated as N). In the other regions of the epitaxial layer, the resistivity is further increased, forming region 6 at the surface designated as N−.

Figure 1D:
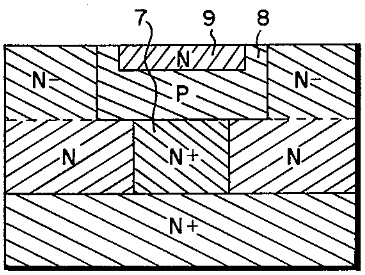

Finally, the collector and base are diffused into region 5 of the epitaxial layer, above emitter 7, as shown in FIG. 1D. Where an oxide layer has been formed on the surface, holes are etched in the oxide by well known methods to permit the indiffusion of base and collector regions. Referring to FIG. 1D, the base region 8, of the opposite conductivity type from the emitter, and of higher resistivity, is diffused into the epitaxial layer in contact with the emitter as shown, forming a base-emitter junction. The collector region 9, of the same conductivity type as the emitter, is then diffused into the base. This region is usually of higher resistivity than the base, and may be of lower or about the same resistivity as the emitter, as desired. A higher resistivity collecter is preferred to provide a higher breakdown voltage in the device. The relative size of the emitter, base, and collector regions is not critical; however, the emitter preferably has a smaller surface area than the base.

Another method of manufacturing the devices of this invention is shown in FIGS. 2A–D. Substrate 1 is first epitaxial layer 2 are provided as described above. As shown in FIG. 2 a pattern of impurities 10 of the lower conductivity type as epitaxial layer 2 is formed upon the epitaxial layer. This is usually done by masking the surface of the substrate with a material resistant to diffusion of the impurities use. When the substrate is silicon, silicon dioxide is a preferred mask. Holes are etched in the mask where the pattern is required by photoengraving processes known in the art. The surface of the substrate is then subjected to a gaseous atmosphere containing the desired impurities. These impurities diffuse into the unmasked portion of the surface of epitaxial layer 2. The diffusion time and depth depend upon the resistivity and depth of the pattern desired. The use of this method, however, is not essential to the invention. Alternatively, the impurity pattern may be deposited on the substrate in any manner such as by painting or spraying a slurry or mixture containing the impurity element or its oxide. In the example illustrated, the impurities were N-type, such as antimony, arsenic, or phosphorus. If a P-type pattern were desired, P-type impurities such as gallium, aluminum, boron, or indium would be used. The choice of specific impurity used often depends upon its diffusion rate in the substrate and its ability to be masked by the masking used.

Figure 2C:
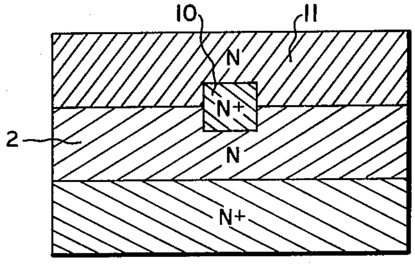

In FIG. 2C, a second high-resistivity epitaxial layer 11 of the same type as the first epitaxial layer is now formed over the first epitaxial layer 2 and pattern of impurities 10. This second epitaxial layer is formed in the same way as the first layer. Either during or after the deposition of the second epitaxial layer 11, the predeposited region of impurities 10 is diffused entirely through the first epitaxial layer 2 so as to be in contact with the substrate 1 and to form the emitter. This diffusion step also results in some diffusion of these impurities into the second epitaxial layer 11. The base region 13 and collector region 14 are now indiffused above the emitter exactly as was done for regions 8 and 9 in FIG. 1D by methods well known in the art. The resistivity of base region 13 is controlled so that it is higher than the resistivity of emitter region 12. The collector resistivity is preferably high, as previously discussed. The completed device is shown in transverse section in FIG. 2D and in plan view in FIG. 3.

Still another method of making the reverse epitaxial transistor of this invention is shown in FIG. 7. This method begins with a substrate 32 shown in FIG. 7A. A pattern of impurities 33 is deposited on the surface of substrate 32, as shown in FIG. 7B. Region 33 forms the emitter of the transistor. Over substrate 32 and impurity pattern 33 is deposited a higher resistivity epitaxial layer 34, shown in FIG. 7C, as previously described. Referring to FIG. 7D, the base of the transistor 35, of the opposite conductivity type from the substrate, is then diffused into epitaxial layer 34 and into contact with emitter 33 to form an emitter-base junction. Finally, a collector region 36, preferably of higher resistivity than epitaxial layer 34 (therefore designated N−) is diffused into base region 35, forming a collector-base junction. Low-resistivity emitter region 33, higher-resistivity base region 35, and high-resistivity collector region 36 together form the reverse epitaxial transistor of the invention.

Figure 7A:
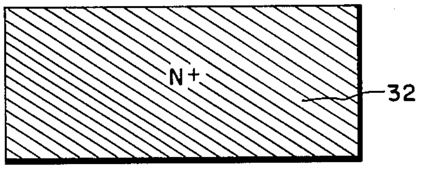
Figure 7B:
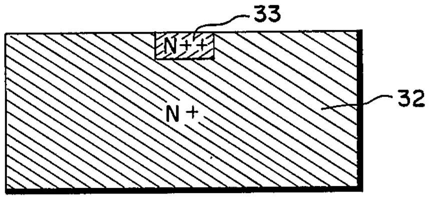
Figure 7C:
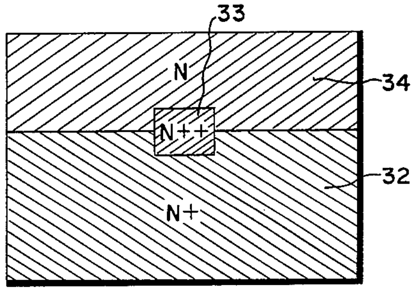
Figure 7D:
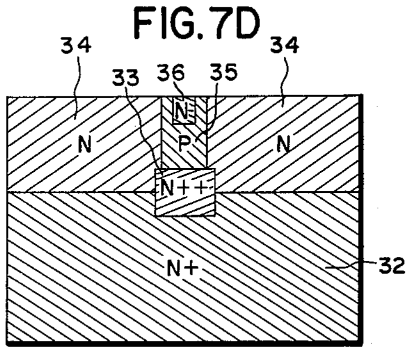

Referring to FIG. 7D, the critical portion of the device is the region of emitter 33 immediately beneath the emitter-base junction. This area, extending about one diffusion length beneath the emitter-base junction, should have a high concentration of charge carriers in order for the device to be a good reverse epitaxial transistor with a high current gain in the reverse direction (now forward). This concentration of charge carriers is substantially in excess of the average charge carrier concentration in the portion of the base region beneath the collector—preferably 100-fold or more as large. The distance covered by one diffusion length varies with the dopant, the diffusion technique, the charge carrier concentration, the carrier lifetime, etc. In practice, one diffusion length is usually between about 1 and 50 microns.

Figure 2D:
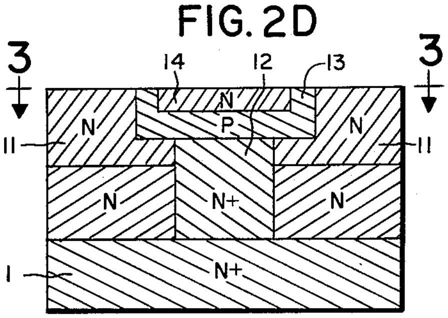
Figure 3:
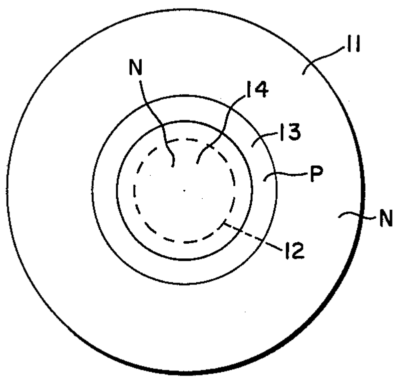
FIG. 3 is a greatly enlarged, somewhat schematic plan view of the device shown in transverse section in FIG. 2D.

As long as the above relationship is maintained, the construction of the reverse epitaxial transistors need not be as shown in FIGS. 1D, 2D, and 7D. Another form of the device is shown in FIG. 8A–C. To make this device, three regions of impurities 38, 39, and 40 are deposited as was done with region 33 of FIG. 7B. However, the center region of impurities 38 is preferably slower-diffusing than the impurities of regions 39 and 40. Then, when the epitaxial layer 41 is grown, regions 39 and 40 diffuse entirely through the epitaxial layer, whereas region 38 does not, as shown. This, and other techniques used to achieve this result are fully described in copending application Serial Number 228,807, filed October 8, 1962, now abandoned, assigned to the same assignee as this invention. In this embodiment, epitaxial layer 41 is of the opposite conductivity type from the substrate and forms the base of the transistor. The resistivity relationship of the epitaxial layer 41 forming the base, and of emitter region 38 is controlled so that the proper relationship of charge carrier concentration described above maintains. Finally, the collector region 42 shown in FIG. 8C is diffused into the epitaxial layer 41.

Although it should not be construed as limiting the scope of the invention, the following example is included to provide specific data on one reverse epitaxial transistor prepared in accordance with this invention.

*Example*

An epitaxial transistor was prepared as shown in FIG. 7A–C. The concentration of the N-type impurities (phosphorus) in the portion of emitter region 33 immediately beneath the emitter-base junction was about $9\times10^{20}$ atoms of phosphorus per cc. Boron was used as the P-type impurity to form base region 35. The average concentration of these impurities in the portion of base region 35 beneath the collector region 36 was about $10^{19}$ atoms per cc. It is thus apparent that the concentration of charge carriers or impurities in the area of the emitter region immediately beneath the emitter-base junction is about 90-fold as great as the average charge carrier concentration in the portion of the base region beneath the collector. The impurity concentration of the N-type phosphorus impurities in the higher resistivity epitaxial layer 34 was about $6\times10^{16}$ atoms per cc. The collector concentration of N-type phosphorus impurities was about $6 \times 10^{20}$ atoms per cc.

When current was passed from emitter to collector to achieve a collector current of about 5 ma., the device had a forward (emitter-to-collector) current gain of about 35; the reverse current gain was about 30. A forward current gain of 35 is considered adequate for a switching transistor. It is preferable in the devices of the invention that the current gain in the forward direction exceed that in the reverse.

Figure 4:
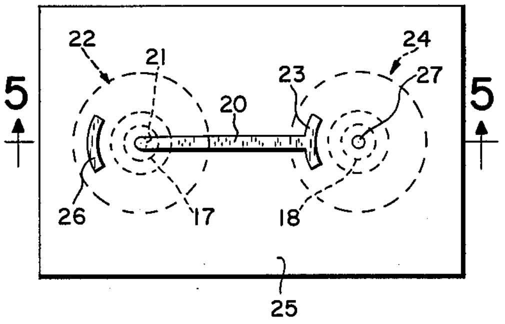
FIG. 4 is a greatly enlarged, somewhat schematic plan view of a plurality of devices of this invention formed in one substrate.
Figure 5:
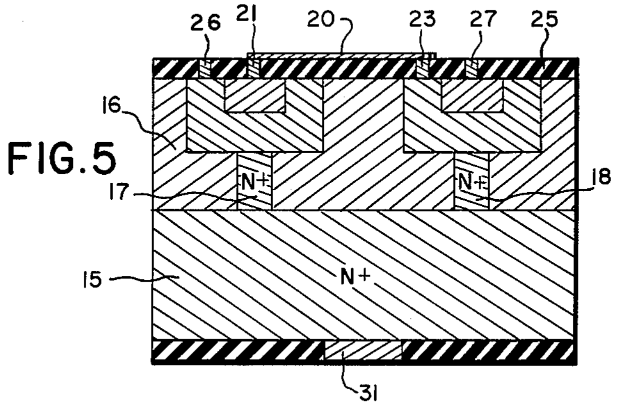
FIG. 5 is a transverse section taken along the line 5—5 of FIG. 4.

FIGS. 4 and 5 show an integrated solid-state circuit having two reverse epitaxial transistors of the method of the invention in one block of semiconductor material. Since the substrate 15, epitaxial layer 16, and emitter regions 17 and 18 are all of the same conductivity type, an effective electrical connection is made between the emitters by the substrate 15, without need of any external electrical connection. The device is particularly useful as a connected or grounded-emitter amplifier. Again, the critical charge carrier relationship is maintained between the portion of regions 17 and 18 immediately beneath the emitter-base junction and the portion of the respective bases beneath the respective collectors.

An alternative to the construction shown in FIG. 5 is illustrated in FIG. 9. There the substrate 43 itself forms the common emitter of both of the transistors (or however many are desired). Epitaxial layer 44 and base regions 45 and 46 are formed exactly as described for regions 39, 40, and 41 in FIG. 8. In this case, however, the epitaxial layer serves as the isolating region and the outgrown regions 45 and 46 serve as bases. The reverse was true in FIG. 8. Collectors 47 and 48 are diffused into the bases in a conventional manner. Again, the critical charge carrier concentration relationship is maintained between the portion of the substrate-emitter 43 immediately beneath base regions 45 and 46 and the portion of base regions 45 and 46 beneath collector 47 and 48, respectively.

Figure 6:
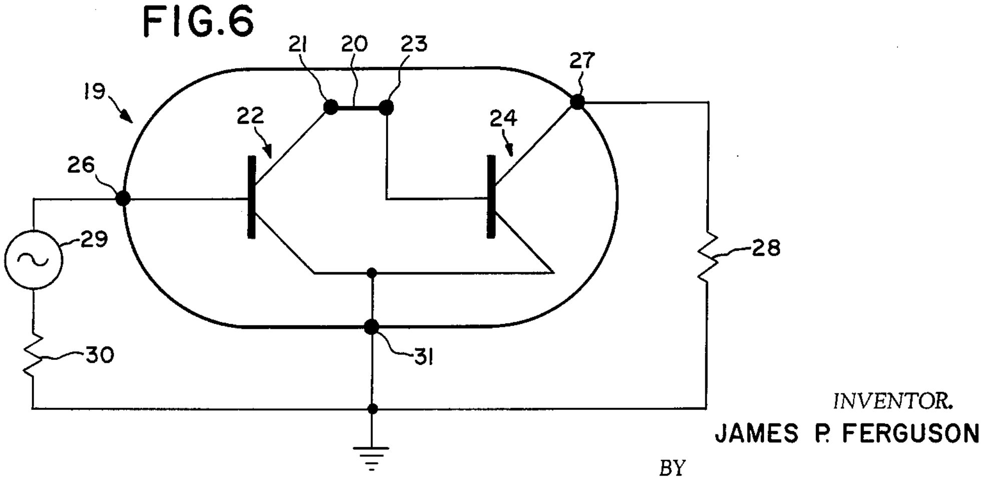
FIG. 6 is an illustrative circuit using the device of FIGS. 4 and 5.

A circuit using the device of FIGS. 4 and 5 or FIG. 9 is shown in FIG. 6. The device is shown at 19 by its standard circuit symbol. Referring now to FIGS. 4, 5, and 6, a connection 20 is made on the surface of the device between collector electrode 21 of transistor 22 and base electrode 23 of transistor 24. Usually, this connection is made as shown, by depositing metal, such as aluminum, over oxide layer 25 by known methods. Holes are etched in the oxide so that contact is made with the desired regions of the semiconductor. Electrode 26, the base electrode of transistor 22, and electrode 27, the collector electrode of transistor 24, may be deposited in holes in oxide layer 25 at the same time.

For a common or grounded-emitter amplifier shown in FIG. 6, collector electrode 27 of transistor 24 is connected to the load, shown by load resistor 28. The signal source 29 is in series with resistor 30. The signal is introduced through base electrode 26 of transistor 22. Both resistor 28 and resistor 30 are grounded. The common-emitter contact 31 is on the bottom of the low-resistivity substrate region 15. However, as in the embodiment shown in FIG. 9, the contact could be made to the N epitaxial layer on the surface of the device. In the circuit, the common-emitter is grounded, as shown.

The available power gain of a common-emitter transistor amplifier is higher than either a common-base or a common-collector transistor amplifier. Furthermore, the common-emitter amplifier is capable of amplifying both current and voltage at the same time, while the current gain of the common-base amplifier is always less than unity, and the voltage gain of the common-collector amplifier is always less than unity.

A common or grounded-emitter amplifier is but one of the many applications of the concept of this invention. It is applicable to any circuit having connected emitters of more than one transistor. The skilled practitioner will realize that many modifications and variations can be made in the invention as described above which are still within its spirit and scope. Therefore, the only limitations to be placed on the scope of this invention are those expressed in the following claims.

What is claimed is:

1. A reverse epitaxial transistor having a substrate, a first region, a second region, and a third region, which comprises:

a substrate of one conductivity type,
an epitaxial layer on said substrate,
a first region of said one conductivity type disposed at least in part within said substrate,
a second region of the opposite conductivity type from said substrate disposed within said epitaxial layer and adjacent to said first region, forming a first PN junction therewith, the charge carrier concentration in the area of said first region within about one diffusion length beneath said first PN junction being substantially in excess of the average charge carrier concentration in the portion of said second region beneath said third region, and
a third region of said one conductivity type disposed within and immediately adjacent to said second region, forming a second PN junction therewith said second PN junction completely surrounding and isolating said third region.

2. Reverse epitaxial transistor of claim 1, wherein said third region is of higher resistivity than said second region.

3. Reverse epitaxial transistor of claim 1 wherein said first region has a smaller cross-sectional area than said second region at their plane of adjacency.

References Cited by the Examiner

UNITED STATES PATENTS

| | | | |
|---|---|---|---|
| 2,663,806 | 12/1953 | Darlington | 317—234 |
| 2,981,877 | 4/1961 | Noyce | 317—235 |
| 2,985,804 | 5/1961 | Buie | 317—235 |
| 3,070,466 | 12/1962 | Lyons | 148—1.5 |
| 3,074,826 | 1/1963 | Tummers | 148—1.5 |
| 3,133,336 | 5/1964 | Marinace | 317—235 |
| 3,165,811 | 1/1965 | Kliemack et al. | 317—235 |

OTHER REFERENCES

Two-Collector Transistor for Binary Full Addition, by Rutz, IBM Journal Research Development, July 1957, pp. 212–222.

Light-Activated Semiconductor Switch, by Pieczonka, IBM Tech., Disc. Bull., vol. 7, No. 7, December 1964, pp. 618–619.

Lighten: IBM Tech. Disc. Bull., vol. 4, No. 10, March 1962, pp. 58–59.

Theuerer et al.: Proc. of the IRE, September 1960, pp. 1642–1643.

JOHN W. HUCKERT, *Primary Examiner.*

JAMES D. KALLAM, *Examiner.*

A. S. KATZ, J. D. CRAIG, *Assistant Examiners.*